(12) United States Patent
Hopcroft

(10) Patent No.: US 6,621,387 B1
(45) Date of Patent: Sep. 16, 2003

(54) MICRO-ELECTRO-MECHANICAL SYSTEMS SWITCH

(75) Inventor: Matthew A. Hopcroft, Atherton, CA (US)

(73) Assignee: Analatom Incorporated, Sunnyvale, CA (US)

( * ) Notice: Subject to any disclaimer, the term of this patent is extended or adjusted under 35 U.S.C. 154(b) by 0 days.

(21) Appl. No.: 10/084,561

(22) Filed: Feb. 25, 2002

Related U.S. Application Data

(60) Provisional application No. 60/271,113, filed on Feb. 23, 2001.

(51) Int. Cl.[7] .............................. H01P 1/10; H01H 57/00
(52) U.S. Cl. ..................... 333/262; 333/105; 333/258; 333/101; 200/181
(58) Field of Search ................................ 333/262, 105, 333/258, 101; 200/181

(56) References Cited

U.S. PATENT DOCUMENTS

| | | | | |
|---|---|---|---|---|
| 5,880,921 A | * | 3/1999 | Tham et al. ................ | 361/233 |
| 6,133,807 A | * | 10/2000 | Akiyama et al. ............ | 333/101 |
| 6,426,687 B1 | * | 7/2002 | Osborn ........................ | 333/262 |
| 6,440,767 B1 | * | 8/2002 | Loo et al. ..................... | 438/52 |
| 6,472,962 B1 | * | 10/2002 | Guo et al. ................... | 333/262 |

* cited by examiner

*Primary Examiner*—Patricia Nguyen
(74) *Attorney, Agent, or Firm*—Heller Ehrman White & McAuliffe

(57) ABSTRACT

A micro-electro-mechanical switch includes a transmission line having a gap disposed along it. The switch also includes at least one ground plane located proximal to the transmission line. A first bridge is configured to close the gap along the transmission line, and a second bridge is configured to connect the transmission line to the ground plane. A method of manufacturing a micro-electro-mechanical switch includes forming, on a first substrate, a transmission line and at least one ground plane, wherein the transmission line includes a gap along it. The method also includes forming, on a second substrate, a first bridge configured to close the gap disposed along the transmission line, and a second bridge configured to connect the transmission line to the ground plane. Then transferring the first and second bridges to the first substrate.

20 Claims, 6 Drawing Sheets

MICRO-ELECTRO-MECHANICAL SYSTEMS SWITCH

REFERENCE TO PRIORITY DOCUMENT

This Application claims priority to pending U.S. Provisional Application Serial No. 60/271,113 filed Feb. 23, 2001, entitled "MICRO-ELECTRO-MECHANICAL SYSTEMS SWITCH" by Matthew A. Hopcroft. Priority of the filing date of Feb. 23, 2001 is hereby claimed, and the disclosure of the Provisional Patent Application is hereby incorporated by reference.

BACKGROUND OF THE INVENTION

The invention relates to electronic switches. In particular, the invention relates to micro-electro-mechanical radio frequency (RF) switches.

SUMMARY OF THE INVENTION

The invention relates to high frequency switching of radio frequency signals. In one aspect of the invention, a micro-electro-mechanical switch includes a transmission line having a gap disposed along it. The switch also includes at least one ground plane located proximal to the transmission line. A first bridge is configured to close the gap along the transmission line, and a second bridge is configured to connect the transmission line to the ground plane.

In an additional aspect of the invention, a method of manufacturing a micro-electro-mechanical switch includes forming, on a first substrate, a transmission line and at least one ground plane, wherein the transmission line includes a gap along it. The method also includes forming, on a second substrate, a first bridge configured to close the gap disposed along the transmission line, and a second bridge configured to connect the transmission line to the ground plane. Then transferring the first and second bridges to the first substrate.

Other features and advantages of the present invention should be apparent from the following description of the preferred embodiment, which illustrates, by way of example, the principles of the invention.

DETAILED DESCRIPTION

Figure 1:
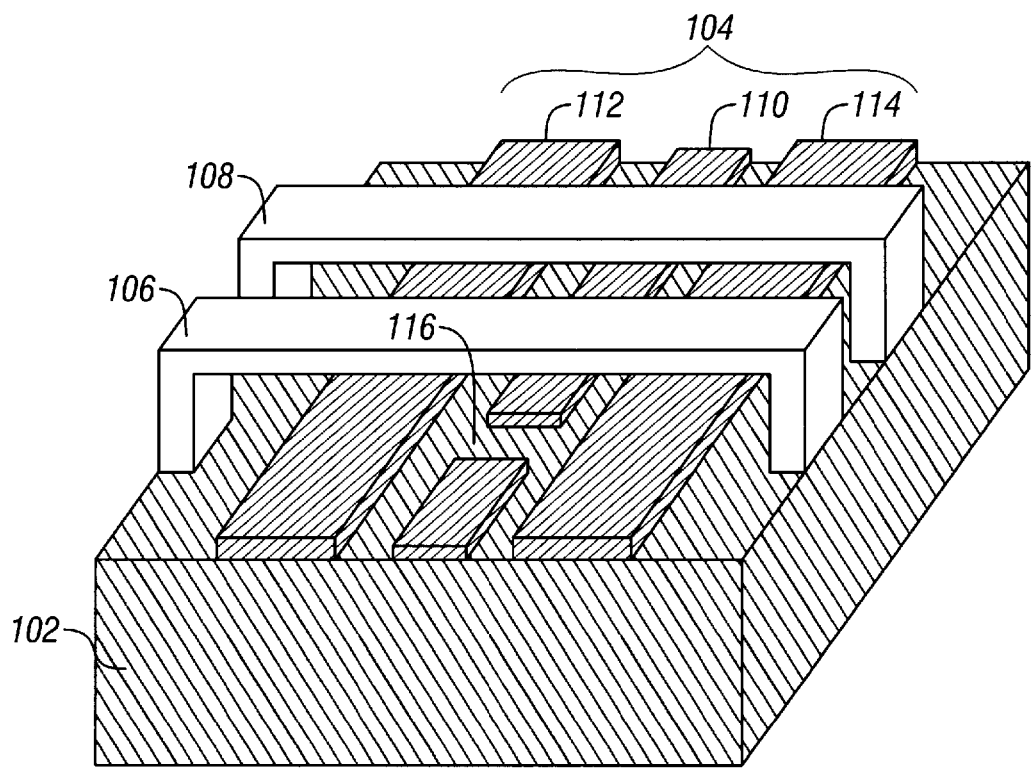
FIG. 1 is an illustration dual bridges suspended over a transmission line in accordance with the present invention.

Many devices need high frequency radio-frequency (RF) switches, often referred to as microwave switches. RF switches are an essential part of many systems, including communication, radar, and others. For example, a missile seeker system may operate in the X (8–12 GHz), Ka (26–40 GHz), and W (94.5 GHz) band frequency ranges. A missile seeker system typically includes a number of RF subsystems, each of which often contains multiple forms of RF switches. If these switches could be designed and fabricated in a cost-effective, reliable manner, the overall usefulness of the RF system would be increased significantly.

Recently, research and development of Microelectromechanical Systems (MEMS) technology has been increasing. MEMS technology typically involves the batch fabrication of micron-scale devices that perform any number of tasks, including sensing, actuation, communication, and more. Because of their small size, these devices are often manufactured using batch fabrication methods developed by the integrated circuit (IC) industry. In some cases, use of IC fabrication methods allows MEMS devices to be integrated with conventional ICs, greatly enhancing the performance, utility, and reliability of the MEMS device as compared to traditional, macro-scale devices. For example, the air bag deployment system in commercial automobiles relies on a MEMS accelerometer. This device is fabricated on a single substrate using modified IC batch fabrication methods, and includes computing circuits for sensor calibration, signal conditioning, and communication, as well as the MEMS acceleration sensing element. The device is inexpensive, reliable, and occupies little space. As with conventional ICs, batch fabrication also allows these devices to be manufactured at almost no incremental cost.

A common technology regime for producing conventional ICs is called complementary-metal-oxide-silicon (CMOS). Worldwide, CMOS technologies account for approximately 75% of computer chip revenue. CMOS IC fabrication facilities and production lines represent major investments, typically US$1B and greater. Therefore, new IC devices that are compatible with CMOS fabrication technologies have a significant advantage in terms of lower production costs, integration with other CMOS devices, and acceptance by customers. In addition, MEMS devices that are fabricated in a CMOS-compatible process have the potential to become "smart", i.e., having advanced decision-making capabilities, simply by adding the appropriate CMOS circuitry to the design.

The convergence of MEMS and CMOS technologies presents many opportunities. For example, traditionally, MEMS devices in general, and high-frequency RF devices in particular, have not been fabricated in CMOS-compatible processes because the materials and methods that are used in CMOS processes have proved largely unsuitable for mechanical features and microwave structures. However, recent advances in MEMS technology have transcended these barriers and created the possibility of batch fabricating MEMS devices in CMOS processes. MEMS technology integrated with CMOS technology promises to provide smart, inexpensive, and reliable devices for sensing, switching, and other applications.

Because of the recent advances in MEMS technology, MEMS fabrication may be designed to allow a MEMS device to be fabricated in a CMOS-compatible process so that s CMOS circuitry can be included on the same device. Typically, CMOS circuitry is not suitable for processing microwave frequency signals, although CMOS circuits for lower-frequency RF signals are used, and research into microwave RF CMOS structures is ongoing. But, the CMOS circuitry may be used to control the microwave switch, even if in a particular system the function of most, or all, of the CMOS circuitry is unrelated to the microwave switching function. The ability to combine system components in a standard fabrication process may prove extremely valuable by reducing system device count, system size, and fabrication complexity.

In one embodiment, a MEMS RF switch may be optimized for the X, Ka, and W frequency bands, for example, for use in military missile seeker applications. In other embodiments, the design and fabrication technologies may be applicable to other frequency bands and commercial applications and markets. For example, with the current high level of demand for wireless systems of all kinds, it is anticipated that such a device would have a wide range of applications and customers, from military radars to commercial cell-phones.

As discussed above, the field of RF MEMS is growing at a rapid rate. Switches, as well as resonators, capacitors, inductors, filters, transmission lines, and even antennas are being fabricated in research environments. The majority of this work is being performed on exotic substrates such as gallium arsenide (GaAs) or quartz. These substrates are chosen because of their high resistivity, micromachining compatibility, or other desirable properties. These substrates and processes are not usually optimized for circuits.

In general, mechanical RF MEMS switches can be broadly divided into two categories: contact or capacitive. Contact switches make conductor-to-conductor contacts with the RF signal line, while capacitive switches do not make conductor-to-conductor contact. Instead, they bring a conductor closer to the RF signal line and induce a large capacitance in parallel with the RF circuit. This large capacitance attenuates the RF signal. These two types of switches have perform differently over different frequency ranges. The contact type switch typically exhibits a more constant RF response over a wider frequency range, while the capacitive switch will perform worse at low frequencies and better at high frequencies than the contact type switch.

Different methods of mechanical actuation may be used in MEMS. A popular form of actuation is an electrostatic actuation (ESA). ESA involves two conductors configured to form a capacitor. When a bias voltage is applied to the capacitor, an attractive force develops between the two conductors. Another form of actuation is thermal actuation. Thermal actuation involves a material, or a pair of materials, that have measurable thermal coefficients of expansion. The materials can be heated by applying a current or by indirect heating.

While RF MEMS as a whole is growing quite rapidly, less work has been done with regard to creating high-frequency RF MEMS devices on CMOS. This may be due to limitations imposed by the CMOS process, which has been optimized for transistor operation. The choice of substrate is generally restricted to silicon, which typically has a resistivity on the order of 1 Ω-cm and is extremely lossy for high-frequency EM radiation. The choice of electrical conductors and mechanical materials is typically polysilicon, aluminum, and various dielectrics. In addition, inherent layer stress and surface passivation are difficult to eliminate from existing foundry runs. Despite these limitations, work continues in this area, because the advantages of integrating MEMS with standard CMOS processes are enormous, in terms of device functionality and initial design and manufacturing costs.

Typically, assembly and packaging of MEMS devices is difficult. The small size of the components and the exotic materials generally require assembly solutions that are different than macro-scale assembly procedures. Some techniques for addressing the difficulties of assembly and packaging of MEMS devices include "micro pick-and-place", self-assembly, fluidic self-assembly, wafer-to-wafer transfer, and others. A motivation for investigation of these techniques are the limitations of planar silicon micromachining.

A technique for wafer-to-wafer transfer, also called batch transfer or flip-chip assembly, has been known since the 1960s. Flip-chip transfer occurs when a structure is fabricated on the face of a "donor" wafer. The donor is then "flipped over" and aligned with the top face of an "acceptor" or "target" wafer. The two wafers are then pressed together so that the structures from the donor are transferred to the acceptor. The transferred structures may be bonded to the acceptor with heat, current, pressure, or a combination of these. The technique is especially useful because it allows devices fabricated in dissimilar processes to be combined into a single device.

MEMS SWITCH ARCHITECTURE

A MEMS microwave switch generally has two components: an RF signal transmission path; and a switching member for connecting and disconnecting that path from the signal source. In one embodiment, these two elements are constructed separately, and then joined together. This technique allows the two elements to be constructed in regimes that are best suited to each task. In addition, the transmission path may be fabricated in such a way as to permit standard integrated circuit (IC) devices to be fabricated simultaneously, on the same substrate. This technique creates the possibility of integrating circuits with the switch itself, enhancing its usefulness for many different applications.

In one embodiment, a microwave switch constructed in accordance with the present invention is a single-pole, single-throw (SPST) "dual-bridge" contact type switch, with pairs of fixed-fixed beams, or bridges, suspended across a microwave transmission line. The bridges have conductors on their undersides which make contact with the transmission line when the bridges are lowered. The signal bridge is located above a gap in the signal line. When the switch is closed, the signal bridge is lowered so that the conductor on the bridge closes the gap in the signal line. When the switch is open, the second bridge, the shunt bridge, is lowered. The shunt bridge makes a connection between the signal line and the ground planes, effectively terminating the transmission line. Only one bridge is lowered at all times. The dual-bridge design is intended to reduce the "off-time" switching delays which occur when a bridge is rising due to its natural spring constant. In this embodiment, a bridge is always being actuated in the faster "down" direction. FIG. 1 depicts dual bridges suspended over the transmission line.

As shown in FIG. 1, the dual bridge switch 100 includes a support substrate 102, onto which a transmission line structure 104 is formed. Two bridges 106, 108 are configured to extend above the transmission line structure. In particular, the transmission line structure 104 includes a center transmission line 110 and two laterally located ground planes 112, 114 in a coplanar waveguide architecture as known in the art. The transmission line includes a gap 116 which can be bridged by a contact pad formed on one of the bridges, as will be further described below. As discussed below, the width of the transmission line 110 and the separation between the transmission line and the lateral ground planes 112, 114 determine the impedance of the transmission line. It will be appreciated that transmission architectures such as microstrip, stripline, suspending stripline, slot line and waveguide architectures are possible in alternative embodiments in accordance with the invention. In addition, other semiconducting materials such as GaAs, or non-semiconduting materials such as aluminum oxide may be used alternatively to support substrate.

The dual bridge switch 100 further includes a first bridge 106 and a second bridge 108. In alternative embodiments, switches with three or more bridges may be implemented. The first and second bridges are positioned such that a cantilever beam section 106a, 108a rests above the transmission line structure 104. Each beam section possesses sufficient flexibility to allow their repeated deflection down to the transmission line without damage. The first bridge 106, having a contact on the bridge surface oriented towards the transmission line and aligned with the gap in the transmission line, is operable to close the gap 116 in the transmission line during the "on" state of operation of the switch 100. The second bridge 108, having a contact on the bridge surface oriented toward the transmission line and aligned with the transmission line and a ground plane, is operable to form a short circuit or low impedance path between the transmission line 110 and one or both strips of the ground plane 112, 114 during the "off" state of operation of the switch. Through electrostatic actuation, the beam sections 106a, 108a of the bridges are deflected downward to make contact with the transmission line structure 104, the process of which will be further described below.

Two aspects of the switch are the dimensions of the signal path, or transmission line, and the dimensions of the switching mechanism, or bridges. After these dimensions are determined, the IC design layout files which control the fabrication process can be created.

The Signal Path

Figure 2:
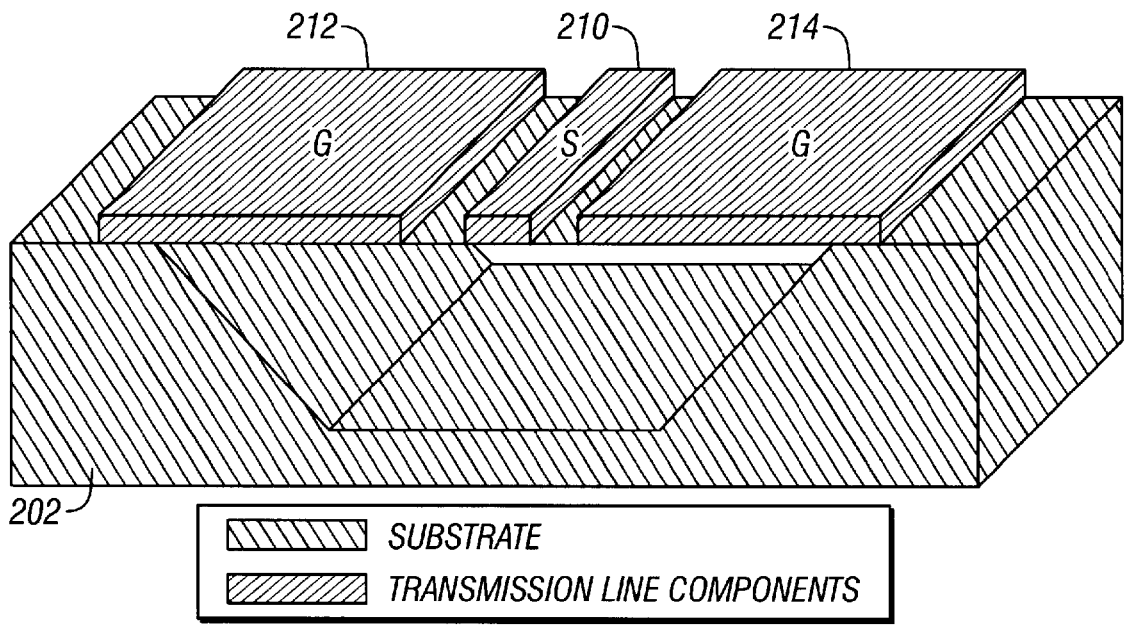
FIG. 2 is a representation of a ground-signal-ground (GSG) transmission line constructed in accordance with the present invention.

In one embodiment, the signal path is a Co-Planar Waveguide (CPW) transmission line in the ground-signal-ground (GSG) configuration. This in-plane structure on substrate 202 consists of a single conductor 210 which carries the signal, flanked on either side by a ground plane 212, 214, as shown in FIG. 2. The in-plane structure of FIG. 2 is well-characterized for high-frequency electromagnetic (EM) wave transmission. The dimensions a, b, c, shown in FIG. 3, affect the characteristics of the transmission line. The signal, or transmission, line in the switch has a gap, such as the gap 116 shown in FIG. 1, which is opened or closed by the switching structure to provide the switching action. The dimension a in FIG. 3 corresponds to the width of the central transmission line, while the dimension b is the width across the transmission line and extending to the edge of the ground planes and the dimension c is the width extending across from the outer edge of one outermost ground plane to the outer edge of the other outermost ground plane. In one embodiment, the transmission line is fabricated in a standard complementary-metal-oxide-silicon (CMOS) process, with post-CMOS micromachining to isolate the transmission line from the silicon substrate. Although the architecture and construction of the illustrated switch is presented in terms of CMOS processing technology, it will be readily appreciated that the switch may be fabricated in other processing technologies, such as gallium arsenide (GaAs)

Figure 3:
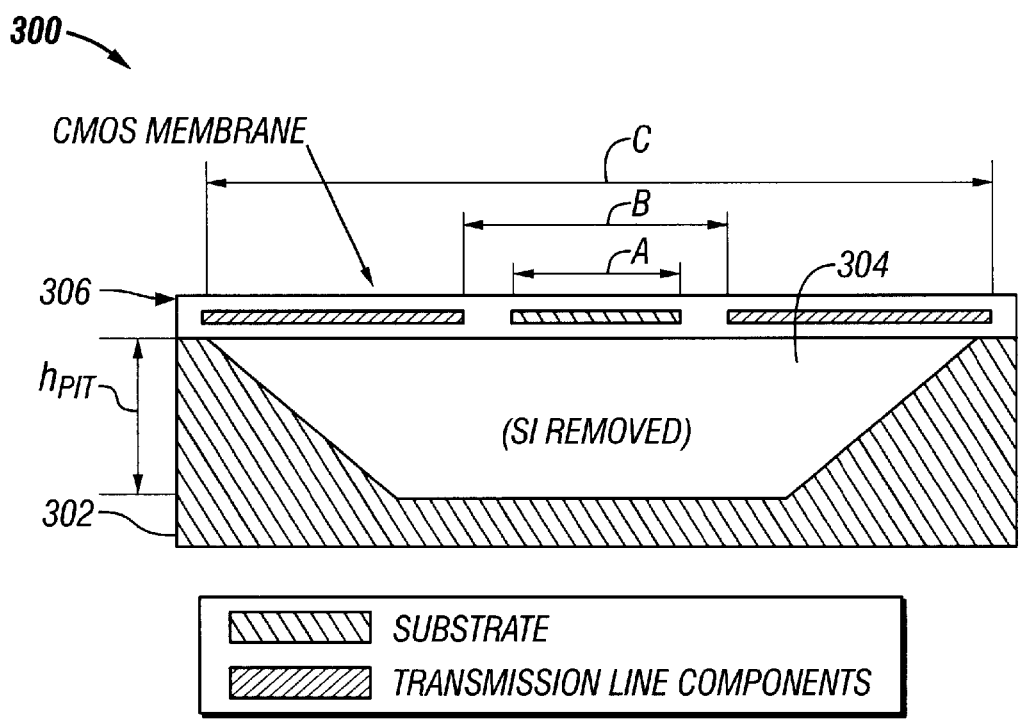
FIG. 3 is a schematic diagram that illustrates an embodiment of the present invention in which the base substrate includes a cavity, or pit, extending beneath the transmission line structure.

Typically, the design of a transmission line begins with the choice of a transmission line impedance $Z_0$. For example, a common value of $Z_0=50 \, \Omega$ may be selected. A basic low-loss RLC transmission line model for the design may be used because (as illustrated in FIG. 3) the transmission line is surrounded only by air and a thin layer of glass (CMOS passivation), which typically has negligible conductivity. The capacitance per unit length, C, of such a structure is given by Equation (1):

$$C = 4 \cdot \varepsilon_0 \cdot \left[ F + \frac{t}{b-a} \right], \quad (1)$$

where F is a geometry factor that accounts for the dimensions of the CPW. The capacitance per unit length relationship is described, for example, in V. Milanovic, "Micromachined Broadband Thermocouple Microwave Poer Sensors in CMOS," The George Washington University, 1998. F is given by Equation (2):

$$F = \frac{K(k)'}{K(k)}. \quad (2)$$

where K(k) is an elliptic integral of the first kind, and k is the argument, given by Equation (3):

$$k = \frac{c}{b} \sqrt{\frac{b^2 - a^2}{c^2 - a^2}}. \quad (3)$$

$$k' = \sqrt{1 - k^2}$$

F, the ratio of elliptic integrals, can be approximated from the following expression of Equation (4):

$$\frac{K(k')}{K(k)} \cong \begin{cases} \dfrac{2 \cdot \pi}{\ln\left(2 \cdot \dfrac{\sqrt{1+k} + \sqrt[4]{4 \cdot k}}{\sqrt{1+k} - \sqrt[4]{4 \cdot k}}\right)} & 0.707 \le k \le 1.0 \\[2ex] \dfrac{1}{2 \cdot \pi} \cdot \ln\left(2 \cdot \dfrac{\sqrt{1+k} + \sqrt[4]{4 \cdot k}}{\sqrt{1+k} - \sqrt[4]{4 \cdot k}}\right) & 0.0 \le k \le 0.707 \end{cases} \quad (4)$$

Once the capacitance per unit length is determined, the inductance per unit length can be calculated from Equation (5):

$$L = \frac{1}{c^2 \cdot C}. \quad (5)$$

The characteristic impedance, then, is given by Equation (6):

$$Z_0 \approx \left(\frac{L}{C}\right)^{\frac{1}{2}}, \quad (6)$$

Values for a, b, and c can be selected such that $Z_0 \approx 50 \, \Omega$. Within this constraint, the dimensions can be modified to allow placement of the openings in the CMOS membrane that are necessary for micromachining. A variety of different a, b, c combinations can be used in different embodiments of the switch. Typically the transmission line is isolated from the CMOS silicon substrate, because the silicon substrate has a low resistivity, about 1 Ω/cm, and attenuates high frequency signals. A micromachining technique, described in detail below, removes the silicon underneath the transmission line as shown in FIG. 3. The depth of the empty "pit" underneath the transmission line which is required to ensure EM isolation can be approximated by Equation (7):

$$h_{pit} \geq 1.5b+(b-a). \tag{7}$$

FIG. 3 illustrates an embodiment 300 where the base substrate 302 includes a cavity 304, or pit, extending beneath the transmission line structure 306. When the base substrate is comprised of a semiconducting material, such as CMOS or GaAs, the semiconductor properties of that material may provide less than desirable isolation which could result in deteriorated switch performance. In this instance, an area of the base substrate 302 may be removed to provide greater isolation of the transmission line structure 306. For example, the removed area may range from 10 μm to 100 μm deep, with the sides of the cavity at an angle of approximately 54–55 degrees. These dimensions are only exemplary and other dimensions may be used in alternative embodiments under the present invention.

The Switching Mechanism

As noted above, in one embodiment, a switching mechanism constructed in accordance with the invention consists of two bridges suspended above a transmission line, as shown in FIG. 1. The bridges will have contacts (described further below), for example gold-plated contacts, on their sides oriented toward the transmission line which will either close the gap in the transmission path or shunt the signal to the ground planes. Generally, only one bridge will be activated at any time with the switch being either in an "on" state or "off" state. In one embodiment, the bridges are operated by electrostatic actuation (ESA). In this embodiment, the portions of the bridges above the ground planes have electrodes on them. These electrodes form a capacitor with the ground planes.

When a bias voltage is applied to the bridge actuation electrodes, the bridge experiences an attractive electrostatic force between the electrodes and the ground planes, causing the bridge to deflect so that the contact on the bridge touches the transmission line on either side of the gap, or touches a portion of the transmission line and a portion of the ground plane, depending on the bridge that is activated.

When the bias voltage is removed from the electrode, the spring force of the bridge restores it to the original position. The layout of the bridges may maximize surface area over the ground planes, thereby maximizing capacitance for faster actuation. The switching mechanism may be fabricated in a custom IC-style process that includes Au electroplating.

Figure 4:
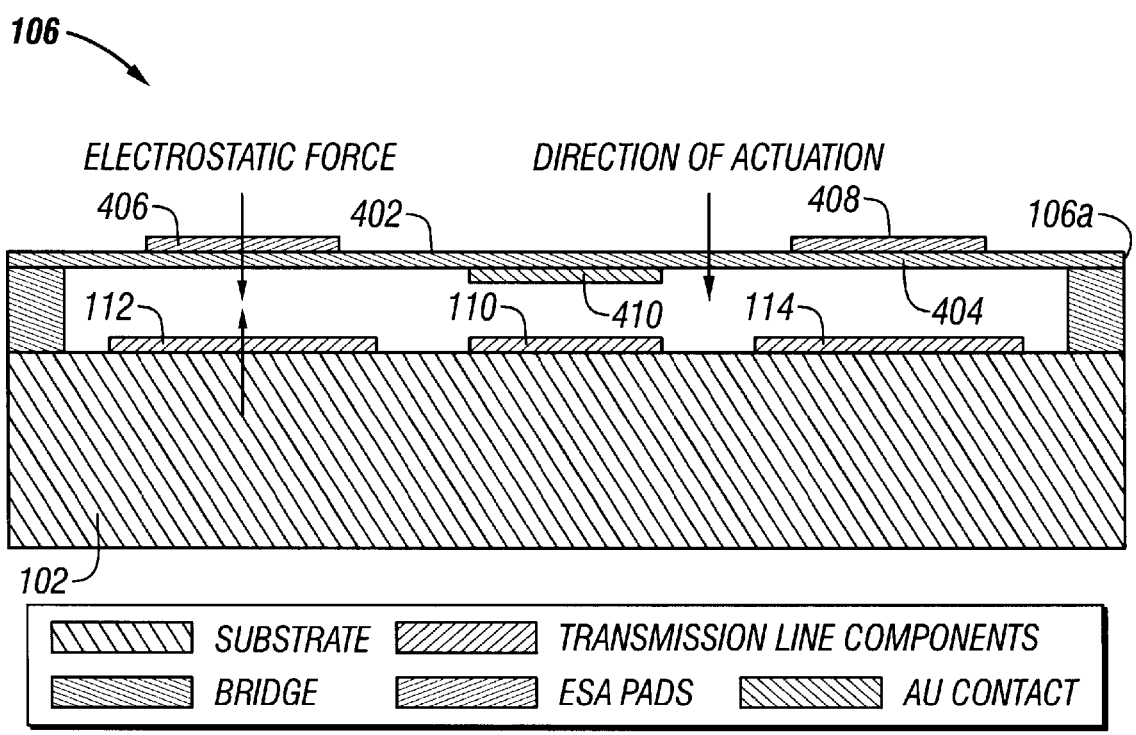
FIG. 4 is a schematic illustration of a suspended bridge structure constructed in accordance with the present invention, showing electrostatic actuation (ESA) pads and a signal contact pad.
Figure 5:
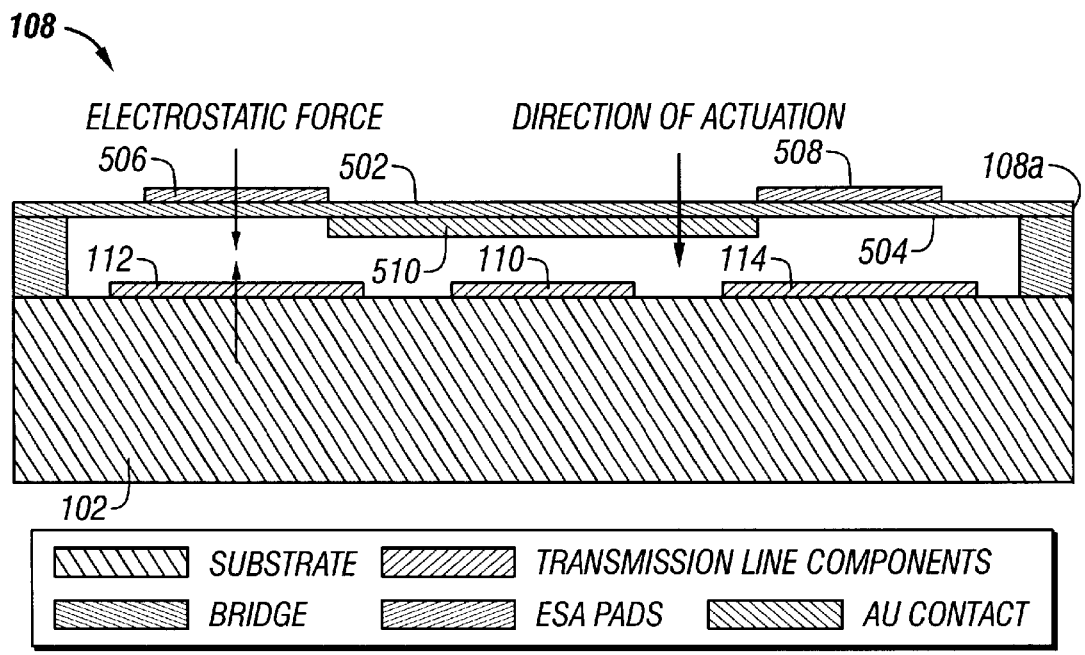
FIG. 5 is a schematic illustration of a suspended bridge structure constructed in accordance with the present invention, showing electrostatic actuation (ESA) pads and a signal contact pad for a bridge that contacts the transmission line and ground strips.

FIG. 4 is a front sectional view of the dual bridge switch described above, such as the switch 100 shown in FIG. 1, illustrating aspects of the construction of the first bridge 106. FIG. 5 shows that the second bridge 108 is constructed in a similar manner to the first bridge, with the exception of the placement of the contact pad, which is located over portions of the transmission line and one or both of the ground plane strips.

FIG. 4 shows that the cantilever beam section 106a of the first bridge 106 includes a top side 402 oriented away from the transmission line, and a bottom side 404 oriented toward the transmission line. The top side 402 includes two electrostatic actuator electrodes 406, 408, each positioned above the respective ground plane strips 112, 114. The bottom side 404 of the first bridge 106 includes a contact pad 410. The contact pad is positioned over the gap 116 in the transmission line (FIG. 1) and is of a sufficient size so that it will close the gap along the transmission line when the beam 106a of the first bridge 106 is deflected downward.

In a similar fashion, the cantilever beam section 108a of the second bridge 108 includes a top side 502 and a bottom side 504, the top side having two actuator electrodes 506, 508. The beam section 108a also includes a contact pad 510 which extends over the transmission line 110 and one or both strips 112, 114 of the ground plane. When the second bridge beam 108 is deflected downward, the contact pad shorts the transmission line 110 to one or both of the ground plane strips 112, 114.

The electrostatic actuator electrodes operate to deflect the beam section of the respective bridge downward through electrostatic attraction. In one embodiment, a voltage potential is applied between the electrodes and the ground plane (one or both strips). The applied potential deflects the beam downward, thereby making contact with the transmission line.

During an "on" state of operation, a voltage potential is applied between the actuator electrodes and the ground plane on the first bridge 106. The beam section 106a of the first bridge is deflected downward, thereby bringing the contact pad 410 in contact with the transmission line 110 on both sides of the gap. That is, the contact pad operates to close the gap 116 in the transmission line, thereby allowing the signal to pass through. A voltage potential is not applied to the electrodes of the second bridge, and as a result it remains undeflected.

During the "off" state, a voltage potential is applied between the electrodes and the ground plane on the second bridge 108, but not the first bridge 106. As a result, the beam section 108a of the second bridge is deflected downward, bringing its contact pad into contact with the transmission line. The contact pad of the second bridge will also contact one or both of the ground plane strips, and as a result the signal will be routed to ground. Substantially simultaneously, the voltage potential applied between the electrodes 406, 408 and the ground plane on the first bridge 106 is discontinued, and as a result the beam section 106a of the first bridge, through its natural restoring spring forces, returns to a rest position, thereby breaking the through path along the transmission line.

In an exemplary embodiment, the base substrate comprises CMOS material ranging from 5 μm to 500 μm in thickness, 100 μm being a typical thickness. The bridges are composed of nitride material and formed as a part of CMOS processing steps, as will be further described below. The clearance between the bridges and the transmission line structure may range from 1 μm and 50 μm, a typical clearance being 10 μm. The cantilever beam section of the bridges will have a thickness corresponding to the clearance from the transmission line structure and which will allow repeated deflection to the transmission line section without damage. The thickness of the cantilever beam section of the contact bridges may range from 0.5 μm to 10 μm thick, 2 μm being a typical thickness.

The separation distance between the bridges may vary. In one embodiment, the separation distance may be substantially equal to a quarter wavelength (or integer multiples thereof) of the effective center frequency of operation. In an alternative embodiment, the separation distance may be substantially equal to one-half wavelength (or integer multiples thereof) of the effective center frequency of operation.

Those of skill in the art will appreciate that other separation distances may also be used in order to optimize impedance matching and switch isolation performance.

In another exemplary embodiment, the contact pads, the transmission line, and the ground plane strips are composed of 0.5 μm thick sputtered gold, although other conductive materials such aluminum, copper, silver of other dimensions may be used in alternative embodiments. The voltage potential applied between the first and/or second contact bridge electrodes and the ground strips may range from +/−0.1V to 100V, 10V being a typically applied voltage potential. It will be appreciated that one or both contact bridges may be located in orientations other than that shown, such as below the transmission line structure.

MEMS SWITCH FABRICATION

In one embodiment, the MEMS switch in accordance with the invention may be constructed using three fabrication steps. Step I includes the fabrication of the microwave transmission line on a first substrate, or wafer. The wafer that the transmission line is fabricated on is called the "acceptor" wafer, because it will have bridge structures added to it. Fabrication Step II includes the fabrication of the bridge structures on a second substrate, or silicon wafer. The second wafer is designated the "donor" wafer, because the bridge structures will be removed from it and "donated" to the acceptor wafer. Fabrication step II may also includes electroplating gold (Au) for the standoff suspension "feet" and "staples." The standoff feet support the suspended bridge over the transmission line, and the staples hold the fabricated bridge structures on the donor wafer until they are ready to be attached to the acceptor wafer. Fabrication Step III includes the transfer of the bridges from the donor to the acceptor.

Fabrication of the Signal Path

In one embodiment, the microwave transmission line may be fabricated in a standard CMOS process, followed by two maskless processing steps. CMOS processes are currently used to fabricate the vast majority of computational ICs in the world, including the "PowerPC" and "Pentium" processors. The choice of a CMOS process to fabricate the transmission line in accordance with the present invention allows the addition of CMOS circuits to the same substrate with low-to-no additional fabrication costs. In one embodiment, the transmission line conductor and ground planes may be CMOS-grade aluminum. In other embodiments, the transmission line conductor and ground planes may be copper, or other acceptable material. After the Al has been deposited and etched, a thin Cr/Au layer may be evaporated to provide good adhesion and electrical contacts for the bridge structures.

Figure 6:
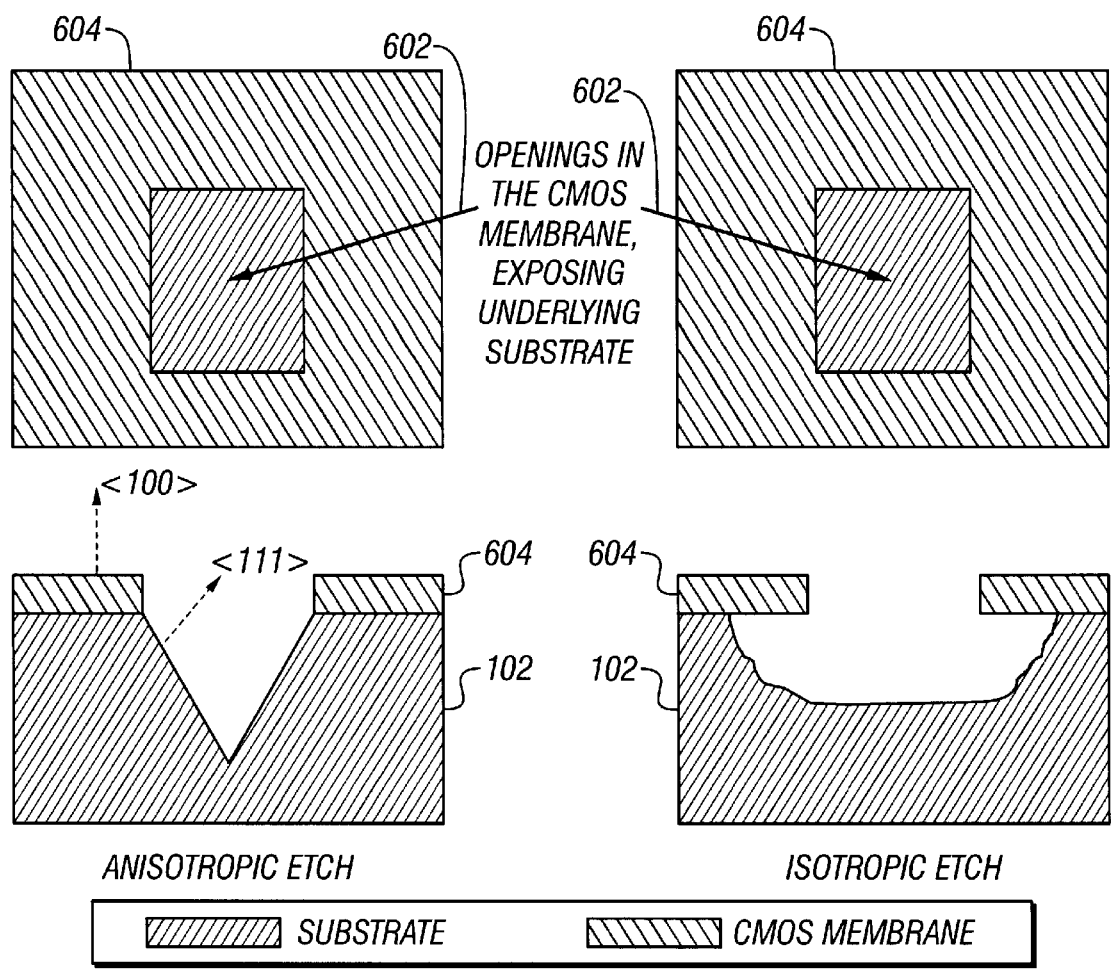
FIG. 6 is a representation of anisotropic and isotropic etches applied in accordance with the present invention.

In one embodiment, post-CMOS micromachining is performed for the evacuation of the CMOS silicon substrate from the area underneath the transmission line. The silicon substrate is conductive, and therefore very lossy for EM waves. Evacuation can be performed using a maskless two-step micromachining process. As illustrated in FIG. 6, the micromachining process requires that openings 602 be left in the CMOS membrane 604 during the CMOS fabrication process. These openings expose the silicon substrate so that it can be removed by exposing the chip, or the entire wafer, to various etchants. The etchants can be applied to selectively destroy the exposed silicon areas while leaving the CMOS membrane intact. Etchants can be classified by their type of etching, either isotropic, in all directions, or anisotropic, not in all directions, as illustrated in FIG. 6.

Figure 7:
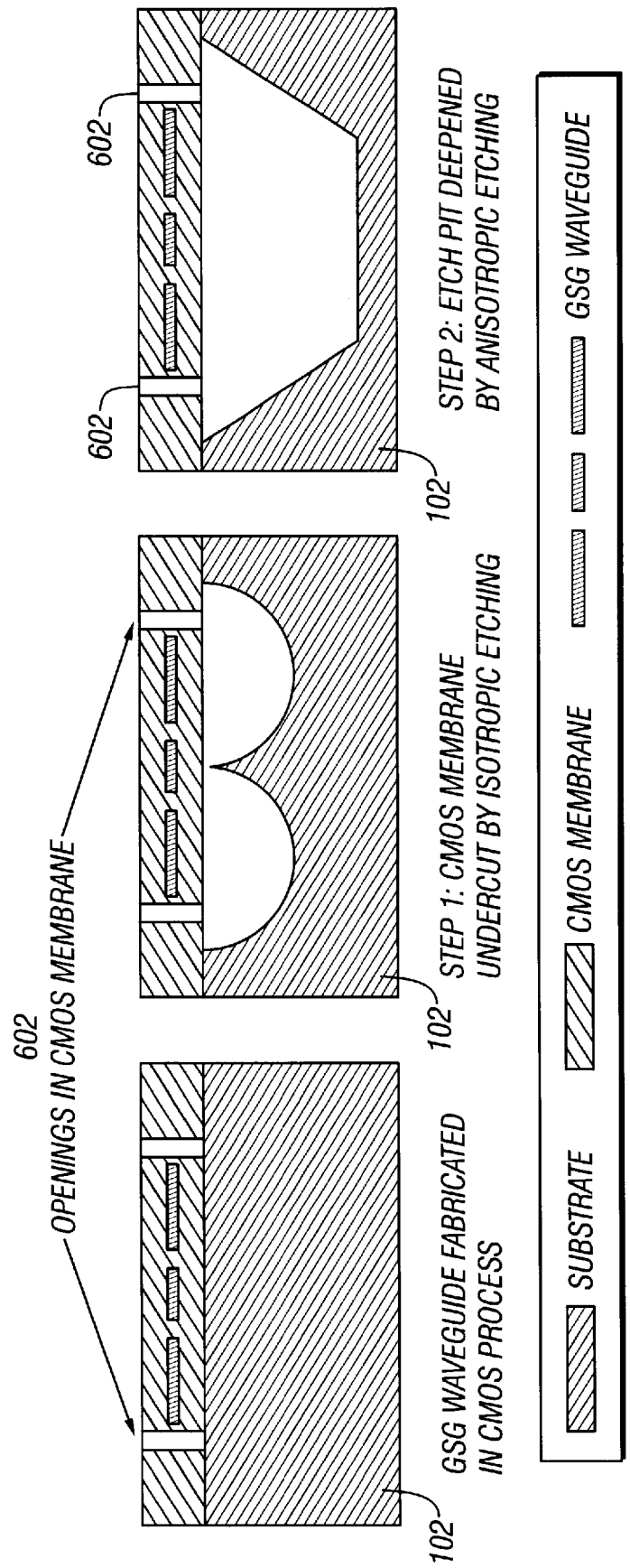
FIG. 7 is a representation of a two-step CMOS micromachining process in accordance with the present invention.

FIG. 7 illustrates the two-step micromachining process in accordance with the present invention. In the first step of the two-step micromachining process, an isotropic etchant, for example XeF$_2$, is used to create an undercut region of CMOS membrane. In the second step of the two-step micromachining process, an anisotropic etchant, for example, TMAH, is used to achieve depth in the etched region. The anisotropic etchant is selective to the <100> plane of the silicon crystal, as indicated in FIG. 6. In a typical CMOS process, the <100> plane is oriented face-up, and the anisotropic etch removes the silicon in the vertical direction at a much greater rate than in the horizontal direction, creating a hole or pit. The etchants may be passed through the openings 602 in the CMOS membrane into the substrate 102 to form the pit beneath the transmission line structure, as indicated in FIG. 6. The micromachining process is shown in FIG. 7.

This combination of CMOS fabrication and post-CMOS micromachining has the following advantages. First is a decrease in fabrication cost because the devices can be batch fabricated using existing CMOS IC technology, plus the non-intrusive and cheap (maskless) addition of micromachining. In addition, integration of CMOS circuits to the device is obtained at little or no extra cost. Because these circuits can perform a wide range of functions, from device addressing to signal amplification, the capabilities of the device can be greatly enhanced.

Fabrication of the Bridge Structures

Figure 8A:
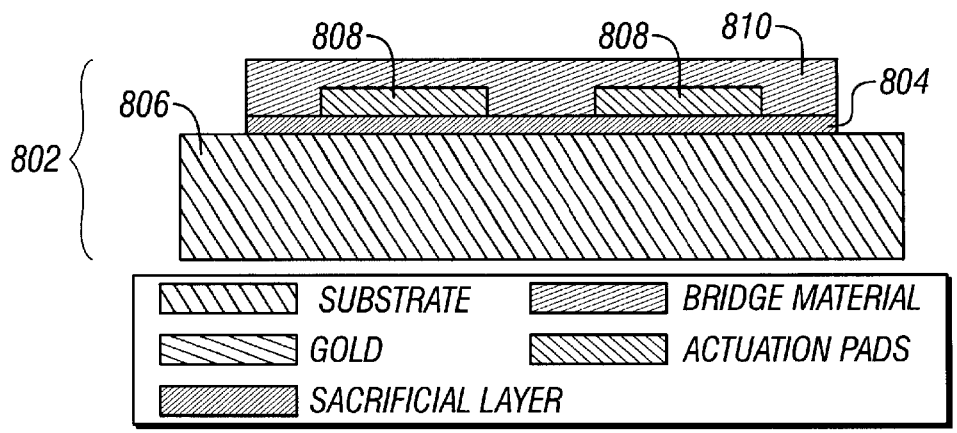
FIG. 8 is a representation of a bridge structure fabrication process in accordance with the present invention.
Figure 8B:
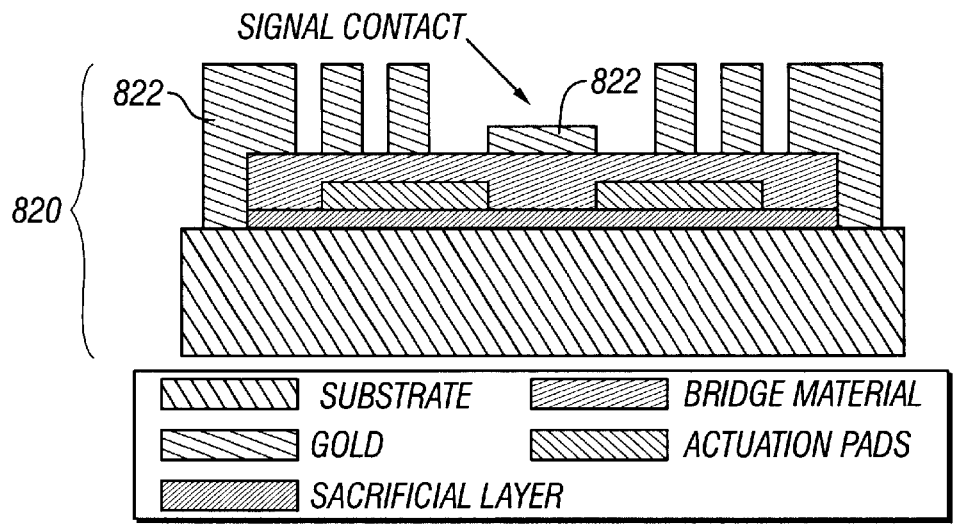
Figure 8C:
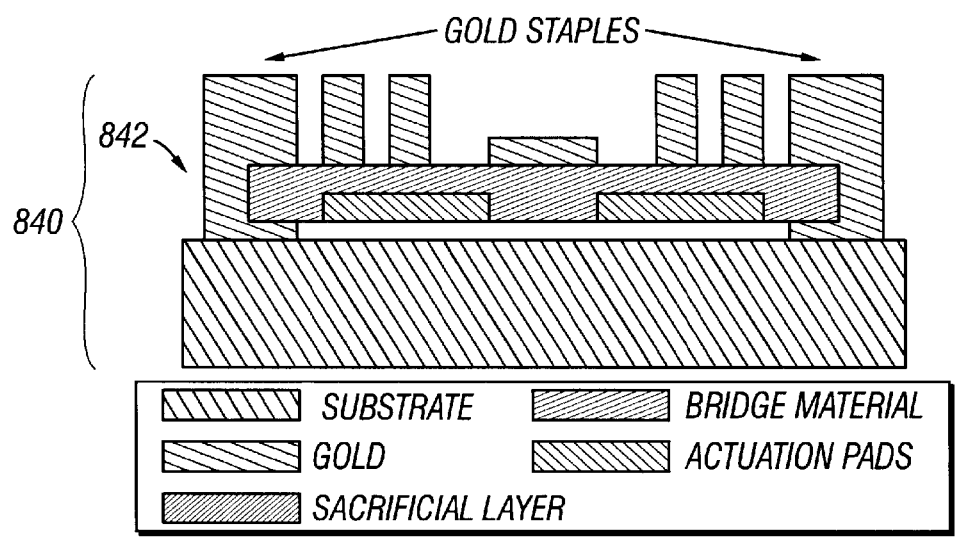

FIG. 8 illustrates how the bridge structures, or switching mechanism, may be fabricated in a custom IC process. In the first process 802, a layer of phospho-silicate glass (PSG) 804 is deposited on a silicon wafer substrate 806. Then, a layer of polysilicon is deposited, patterned, and etched. This polysilicon forms the actuation electrodes 808. Next, a layer of low-stress nitride, the structural material of the switch, is deposited and patterned into the shape of the bridge 810. In the next process 820, a layer of Cr/Au is evaporated, patterned, and etched to form the switch contacts and the actuation vias. Then a second, thinner Cr/Au seed layer is deposited in preparation for electroplating Au. A thick photoresist is deposited and patterned for the Au deposition, which creates Au "staples" and "feet". In the next process 840, after the thick photoresist is stripped off, the PSG sacrificial layer 804 is removed from underneath the bridges, using a standard etch bath. This releases the bridge structures from the underlying silicon wafer and from the surrounding polysilicon, leaving them attached to the wafer only by the gold "staples." This process results in the bridge donor structure 842 that is shown in FIG. 8.

Transfer of the Bridge Structure

Figure 9:
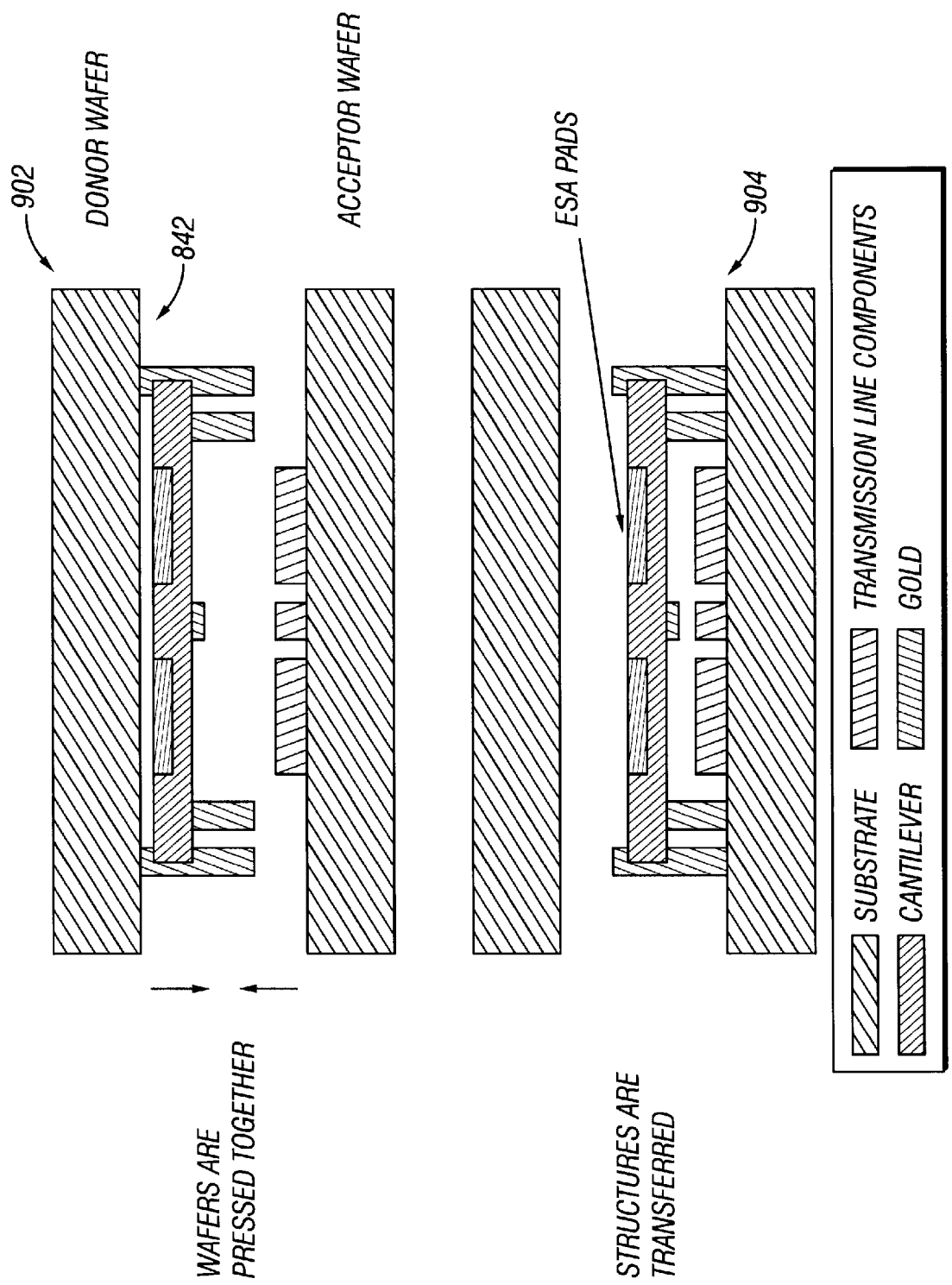
FIG. 9 is a representation of a bridge structure transfer process in accordance with the present invention.

When both the donor and acceptor wafers have been completely fabricated, the donor structures are ready to be transferred to the acceptor wafer. In one embodiment, the two wafers are aligned and their front faces are joined together with a constant force, as illustrated in the top panel 902 of FIG. 9. The gold feet on the donor structures (such as FIG. 8) adhere to exposed Cr/Au covered pads (such as FIG. 7) on the acceptor wafer. The gold staples are attached to the donor substrate only by a small area, so that when the donor wafer is removed, the adhesion of the feet to the acceptor wafer is sufficient to tear the staples and the bridges away from the donor wafer. When the donor wafer is removed, as illustrated in the bottom panel 904 of FIG. 9, the bridge structures remain behind, suspended over the transmission line structures. Some of the gold feet and aluminum pads on the acceptor wafer make the electrical connection from the acceptor wafer to the actuation electrodes on the bridges.

The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

I claim:

1. A micro-electro-mechanical systems (MEMS) switch comprising:
    a radio frequency (RF) transmission line formed on a support substrate, the transmission line having a gap disposed therealong;
    at least one ground plane located proximal to the transmission line;
    a first bridge configured to close the transmission line gap and thereby form an RF signal transmission path; and
    a second bridge configured to connect the transmission line and the at least one ground plane and thereby form a path between the transmission line and the at least one ground plane.

2. A MEMS switch as defined in claim 1, wherein the first bridge further comprises:
    a first surface oriented towards the transmission line;
    a second surface oriented away from the transmission line;
    a conductive pad formed on a location on the first surface of the first bridge, aligned with the transmission line gap; and
    at least one electrostatic actuator electrode formed on the second surface of the first bridge, the at least one electrostatic actuator electrode configured to be electrostatically attracted to the at least one ground plane, thereby bringing the conductive pad of the first bridge in contact with the transmission line so that the conductive pad bridges the gap of the transmission line and forms the RF signal transmission path.

3. A MEMS switch as defined in claim 2, wherein the electrostatic actuator is electrostatically attracted to the at least one ground plane upon the application of a voltage to the electrostatic actuator electrode of the first bridge.

4. A MEMS switch as defined in claim 1 wherein the second bridge further comprises:
    a first surface oriented toward the transmission line;
    a second surface oriented away from the transmission line;
    a conductive pad formed on a location on the first surface of the second bridge, aligned with a portion of the transmission line and a portion of the at least one ground plane; and
    at least one electrostatic actuator electrode formed on the second surface of the second bridge, configured to be electrostatically attracted to the ground plane, thereby bringing the conductive pad of the second bridge in contact with the transmission line and the ground plane, so that the pad contacts portions of the transmission line and portions of the ground plane.

5. A MEMS switch as defined in claim 4, wherein the electrostatic actuator is electrostatically attracted to the at least one ground plane upon the application of a voltage to the electrostatic actuator electrode of the second bridge.

6. A MEMS switch as defined in claim 1, wherein the support substrate comprises a semiconductor material.

7. A MEMS switch as defined in claim 6, further including a cavity formed beneath the transmission line.

8. A MEMS switch as defined in claim 7, wherein the cavity is configured with a depth that is dependent on the width of the transmission line and the distance from the transmission line to the at least one ground plane.

9. A MEMS switch as defined in claim 8, wherein the cavity has a depth of from 10 $\mu$m to 100 $\mu$m beneath the transmission line.

10. A MEMS switch as defined in claim 1, wherein the first bridge and the second bridge each include at least one actuator contact, such that application of energy to a respective bridge actuator contact causes the bridge to be attracted to the ground plane, thereby moving the respective bridge from an initial position into bringing an underside surface of the respective bridge to be moved into contact with the transmission line, and wherein removal of the energy from the actuator contact permits a natural spring force of the respective bridge to move the bridge out of contact and back to the initial position.

11. A MEMS switch as defined in claim 10, wherein the actuator contact comprises an electrostatic actuator electrode and the energy comprises electrical energy, such that application of a voltage to a respective bridge electrostatic actuator electrode causes the bridge to be electrostatically attracted to the ground plane, thereby moving the respective bridge from an initial position into bringing an underside surface of the respective bridge to be moved into contact with the transmission line, and wherein removal of the voltage permits a natural spring force of the respective bridge to move the bridge out of contact and back to the initial position.

12. A method of manufacturing a micro-electro-mechanical systems (MEMS) switch, the method comprising:
    forming on a first substrate, a transmission line and at least one ground plane, wherein the transmission line includes a gap disposed therealong;
    forming on a second substrate, a first bridge configured to close the gap disposed along the transmission line;
    forming on the second substrate, a second bridge configured to connect the transmission line to the at least one ground plane; and
    transferring the first and second bridges from the second substrate to the first substrate.

13. A method as defined in claim 12, wherein forming a first bridge further comprises:
    depositing a sacrificial layer on the second substrate;
    depositing and patterning at least one electrostatic actuator electrode on the sacrificial layer;
    depositing and patterning the first bridge on exposed top surfaces of the sacrificial layer and the at least one electrostatic actuator electrode;
    electroplating a contact pad and at least one support onto the first bridge; and
    removing the sacrificial layer from the second substrate, thereby releasing the bridge from the second substrate.

14. A method as defined in claim 12, wherein forming a second bridge further comprises:

depositing a sacrificial layer on the second substrate;

depositing and patterning at least one electrostatic actuator electrode on the sacrificial layer;

depositing and patterning the second bridge on exposed top surfaces of the sacrificial layer and the at least one electrostatic actuator electrode;

electroplating a contact pad and at least one support onto the second bridge; and removing the sacrificial layer from the second substrate, thereby releasing the bridge from the second substrate.

15. A method as defined in claim 12, wherein transferring the first and second bridges to the first substrate comprises:

inverting the second substrate such that the first and second bridges are oriented toward the top surface of the first substrate;

pressing the first and second substrates together thereby adhering portions of the first and second bridge to the second substrate; and removing the second substrate leaving the first and second substrate attached to the first substrate.

16. A method as defined in claim 12, wherein the substrate comprises a semiconductor material.

17. A method as defined in claim 12, further including forming a cavity in the substrate, beneath the transmission line.

18. A method as defined in claim 17, wherein the cavity is formed with a depth that is dependent on a desired width of the transmission line and distance from the transmission line to the at least one ground plane.

19. A method as defined in claim 18, wherein the cavity is formed with a depth of from 10 $\mu$m to 100 $\mu$m beneath the transmission line.

20. A method as defined in claim 17, wherein the cavity is formed with a micromachining process.

* * * * *